(12) United States Patent
Picker

(10) Patent No.: US 8,734,927 B2
(45) Date of Patent: May 27, 2014

(54) GREEN MULTI-POLYMER T-MOLDING

(75) Inventor: Cyrille Picker, Jacksboro, TN (US)

(73) Assignee: Ultra Tech Extrusions of Tennessee, Lake City, TN (US)

( * ) Notice: Subject to any disclaimer, the term of this patent is extended or adjusted under 35 U.S.C. 154(b) by 171 days.

(21) Appl. No.: 13/276,431

(22) Filed: Oct. 19, 2011

(65) Prior Publication Data
US 2013/0101785 A1    Apr. 25, 2013

(51) Int. Cl.
*A47B 13/08* (2006.01)

(52) U.S. Cl.
CPC .................................... *A47B 13/083* (2013.01)
USPC ............................. 428/100; 428/120; 108/27

(58) Field of Classification Search
CPC ........................................................ A47B 13/083
USPC ............ 428/99, 100, 120; 248/345.1; 108/27
See application file for complete search history.

(56) References Cited

U.S. PATENT DOCUMENTS

| | | |
|---|---|---|
| 4,108,948 A | 8/1978 | Pritchett |
| 4,241,129 A | 12/1980 | Marton et al. |
| 4,287,317 A | 9/1981 | Kitagawa et al. |
| 4,370,373 A | 1/1983 | Janicz |
| 4,481,330 A | 11/1984 | Ohara et al. |
| 5,135,785 A | 8/1992 | Millon |
| 5,334,450 A | 8/1994 | Zabrocki et al. |
| 5,678,380 A | 10/1997 | Azzaar |
| 5,994,462 A | 11/1999 | Srinivasan et al. |
| 6,063,475 A | 5/2000 | Ciancio et al. |
| 6,180,172 B1 | 1/2001 | Hasenkamp et al. |
| 6,333,094 B1 | 12/2001 | Schneider et al. |
| 6,949,283 B2 | 9/2005 | Kollaja et al. |
| 7,001,956 B2 | 2/2006 | Handin, Jr. et al. |
| 7,101,590 B2 | 9/2006 | Schmid et al. |
| 2006/0020067 A1 | 1/2006 | Brant et al. |
| 2009/0280321 A1 | 11/2009 | Empting, Jr. |
| 2010/0227185 A1* | 9/2010 | Empting ....................... 428/495 |

* cited by examiner

*Primary Examiner* — Alexander Thomas
(74) *Attorney, Agent, or Firm* — Pitts & Lake, P.C.

(57) ABSTRACT

A multi-polymer T-molding edge banding primarily to use on an edge of composite wood furniture, wherein the T-molding comprises a core layer with barb, the core layer generally being fabricated from a thermoplastic olefin; a top layer substantially covering the outboard face of the core layer, the top layer being fabricated from a polymer such as polypropylene; and a top coat of curable material laid over the top layer.

14 Claims, 4 Drawing Sheets

GREEN MULTI-POLYMER T-MOLDING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to multi-polymer T-Molding edge banding for wood or wood composite furniture. More particularly, this invention pertains to an improved, green, PVC-substitute T-Molding edge comprising an extrusion of a core layer fabricated from a thermoplastic olefin and a top layer fabricated from a polymer such as polypropylene.

2. Description of the Related Art

T Molding is used as a protective and decorative covering for the edge of composite board or plywood, which has a decorative top surface, such as Formica, for example. This type of construction is very often used in the production of office furniture. The T-Molding is secured to the board by slotting the edge of the board then hammering or pushing the barb of the T-Molding into the slot.

In the past, T-Molding has commonly been formed from flexible poly-vinyl chloride (PVC). PVC has good abrasion resistance and trims easily. More importantly, PVC is dangerous to the environment because, if burned, it decomposes to release chlorine gas, a dangerous chemical. Additionally, flexible PVC continuously emits carcinogenic plasticizers into the environment.

BRIEF SUMMARY OF THE INVENTION

Disclosed herein are varieties and example embodiments of a general inventive concept that comprises a multi-polymer T-molding edge banding primarily to use on an edge of composite wood furniture, wherein the T-molding comprises a core layer with barb, the core layer generally being fabricated from a thermoplastic olefin; a top layer substantially covering the outboard face of the core layer, the top layer being fabricated from a polymer such as polypropylene; and a top coat of curable material laid over the top layer. Generally, the thermoplastic olefin core layer and the polymer top layer are coextruded during the manufacturing process, with the two layers combined under heat and pressure, so that chemical and physical bonds keep the two layers together. The top coat is then added during a later stage in the manufacturing process, and the top coat is then cured, generally by exposure to ultraviolet light, electron bombardment, or both. The resulting multi-polymer T-molding edge banding, generally combining a thermoplastic olefin core layer with a protective polypropylene top layer, in many embodiments exhibits physical properties comparable or superior to PVC-based T-molding, without many of the environmentally hazardous side effects associated with PVC.

In at least one example embodiment of a T-molding edge banding according to the present general inventive concept, the T-molding generally includes a long core strip or core layer of thermoplastic olefin material or other core material comprising the core layer body. A barbed mounting strip or simply "barb" protrudes outward from the inboard face of the core strip and extends lengthwise down the center of the inboard face of the core strip. Generally, the core strip (or core layer) and barb are formed from a single shaped and extruded mass of core material. A top layer, typically much thinner than the core layer, is coextruded with the core layer and substantially covers at least the outboard face of the core layer. The outboard surface of the top layer is covered with a top coat of curable material that reduces the marrability and enhances the abrasion resistance of the T-molding. In many embodiments, the top layer is fabricated from a resilient elastomeric polymer; in a number of example embodiments, the top layer is fabricated from polypropylene or from a mixture of polypropylene and other polymers. The top coat applied to the top layer of the T-molding generally is a curable material, and more particularly in several example embodiments is an activator material cured by exposure to ultraviolet light or electron bombardment during the manufacturing process. Examples of curable activator materials used for the top coat include urethane, polyurethane, acrylic materials, a number of solvent-based mixtures, a number of water-based mixtures, and epoxy.

The present general inventive concept generally embraces a number of multi-polymer T-moldings that combine a resilient, elastomeric olefin core layer with a top layer and a top coat that combine to provide superior physical properties. A T-molding according to the general inventive concept generally exhibits high temperature stability, great "barb memory," and high resistance to abrasion compared to competing T-molding edge bandings, including PVC-based T-moldings. Multi-polymer T-moldings produced from thermoplastic olefins according to the present invention generally are temperature stable compared to many competing T-molding edge bandings, and they have a stiffness that is minimally affected by changes in ambient temperature. Many multi-polymer T-moldings according to the present invention generally have better spring tension than competing T-molding will hold a shape in the face of deformative pressures better than competing T-molding. Multi-polymer T-moldings according to the present invention show great resistance to abrasion and marring compared to PVC-based T-moldings. Fundamentally, multi-polymer T-moldings according to the present invention, compared to PVC-based T-molding, are better able to hold tight against the edge of a table top. Additionally, a T-molding fabricated according to the present general inventive concept is typically "green" or environmentally friendly in that it generally avoids the use, for example, of halogen-containing materials like PVC in its manufacture.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

The present general inventive concept, in some of its several embodiments, comprises a composite multi-polymer T-molding edge banding primarily for use on an edge of composite wood furniture, wherein the T-molding comprises a core layer with barb, the core layer generally being fabricated from a thermoplastic olefin; a top layer substantially covering the outboard face of the core layer, the top layer being fabricated from a polymer such as polypropylene; and a top coat of curable material laid over the top layer. Generally, the thermoplastic olefin core layer and the polymer top layer are coextruded during the manufacturing process, with the two layers combined under heat and pressure, so that chemical and physical bonds keep the two layers together. The top coat is then added during a later stage in the manufacturing process, and the top coat is then cured, generally by exposure to ultraviolet light, electron bombardment, or both. The result is a highly resilient, durable T-molding that exhibits great temperature stability, great "barb memory," and high resistance to abrasion compared to competing T-molding edge bandings, including PVC-based T-moldings. Additionally, a T-molding fabricated according to the present general inventive concept is typically "green" or environmentally friendly in that it generally avoids the use, for example, of halogen-containing materials like PVC in its manufacture.

In one example embodiment of the present general inventive concept, a multi-polymer T-Molding, to use on an edge of composite wood furniture, comprises a core layer fabricated from an elastomeric plastic material; a top layer substantially covering the outboard surface of the core layer; and a top coat of curable material applied to the outboard surface of the top layer. In various embodiments, the core layer comprises a strip of material with an inboard face and an outboard face, and the core layer possesses a barb to fit in a groove in the edge of composite wood furniture, the barb protruding from the inboard face of the strip of material from a position near the center of the strip of material. Generally, the strip of material and the barb comprise a single formed piece. The top layer is formed from a material including polyethylene, and the top layer has in inboard surface substantially in contact with the outboard surface of the strip of material, the top layer and the core layer being coextruded.

Figure 1:
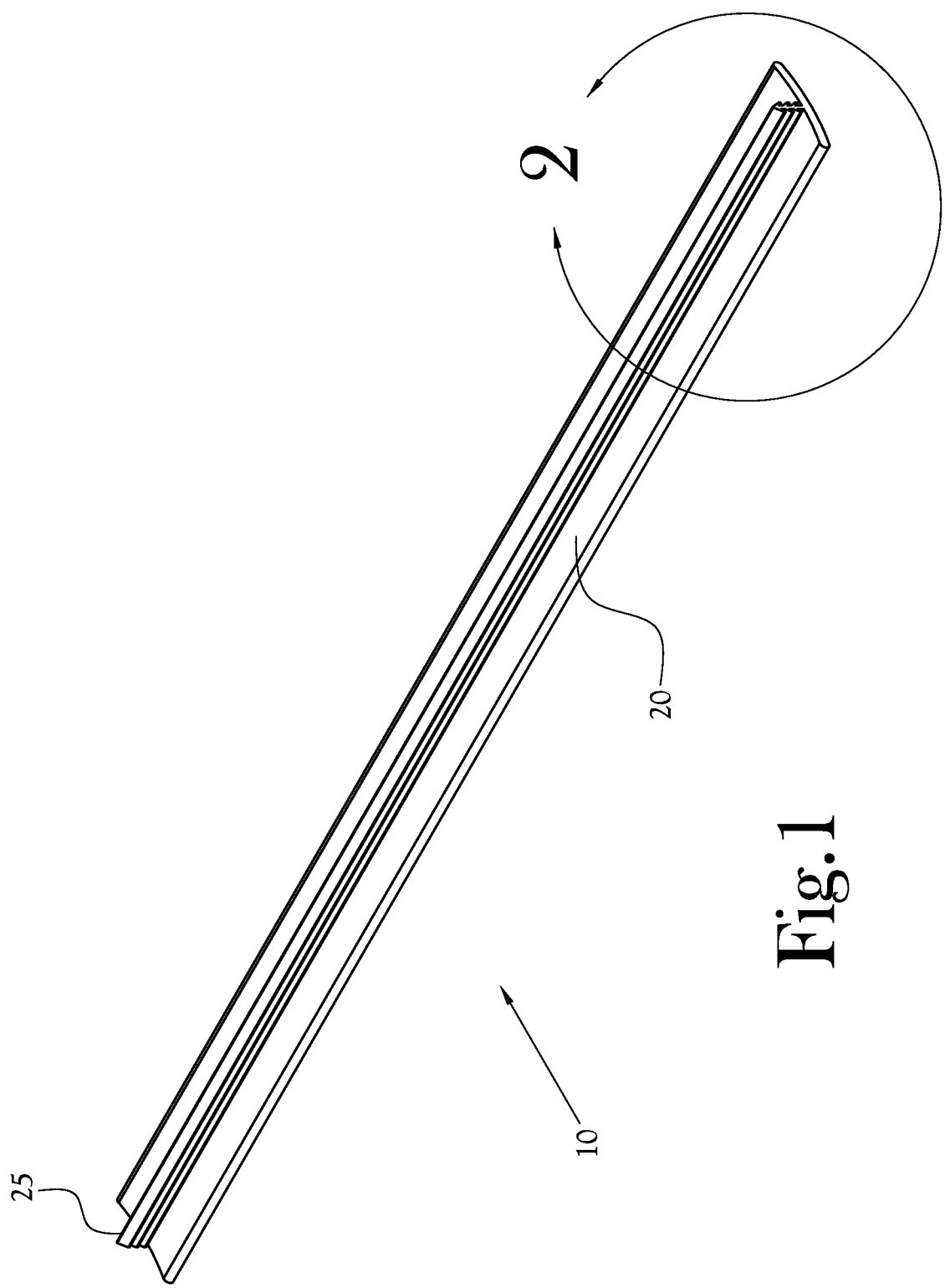
FIG. 1 is a perspective view of one example embodiment of a T-molding edge banding according to the present general inventive.
Figure 2:
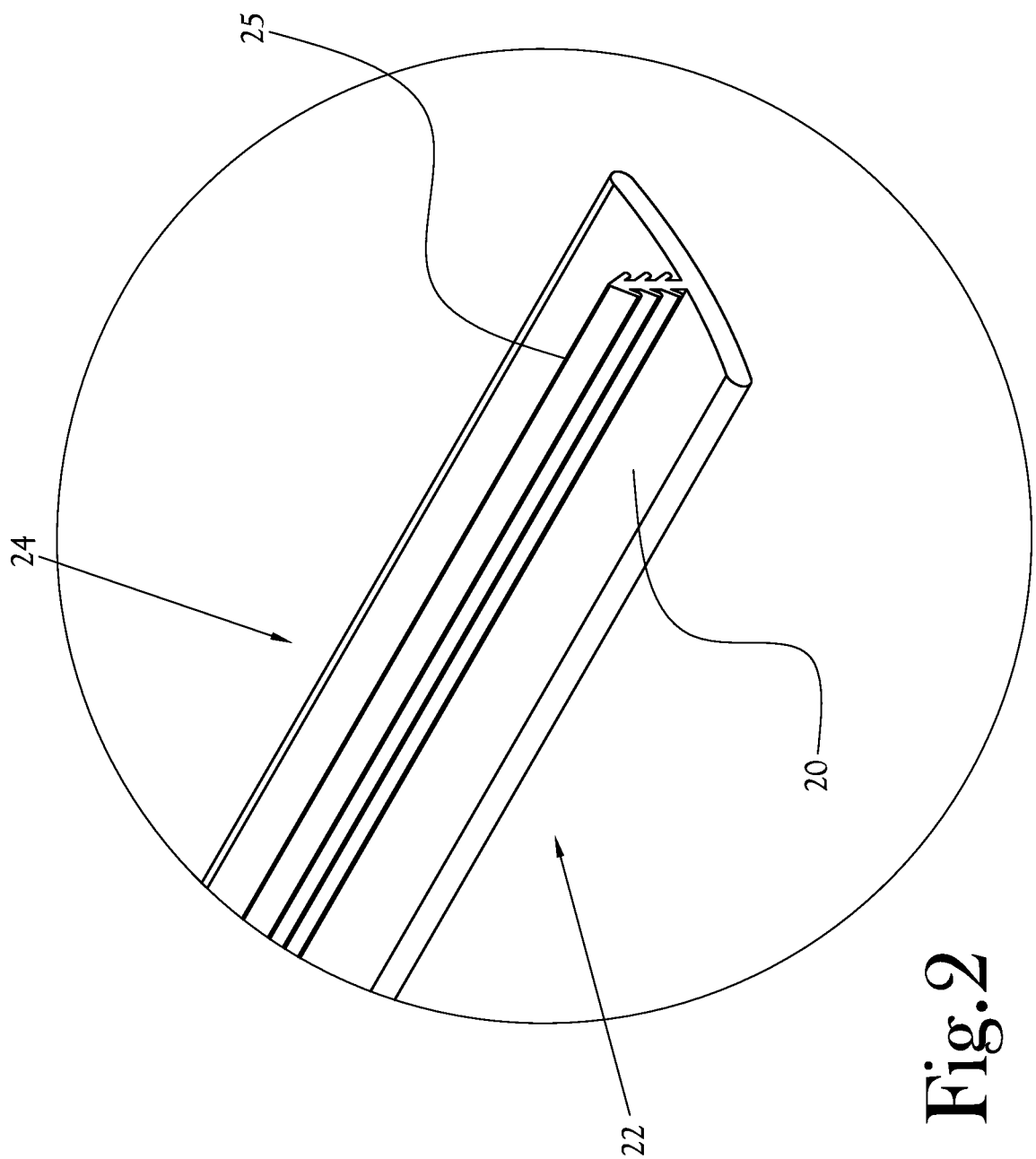
FIG. 2 is a close-up view of the embodiment shown in FIG. 1.
Figure 3:
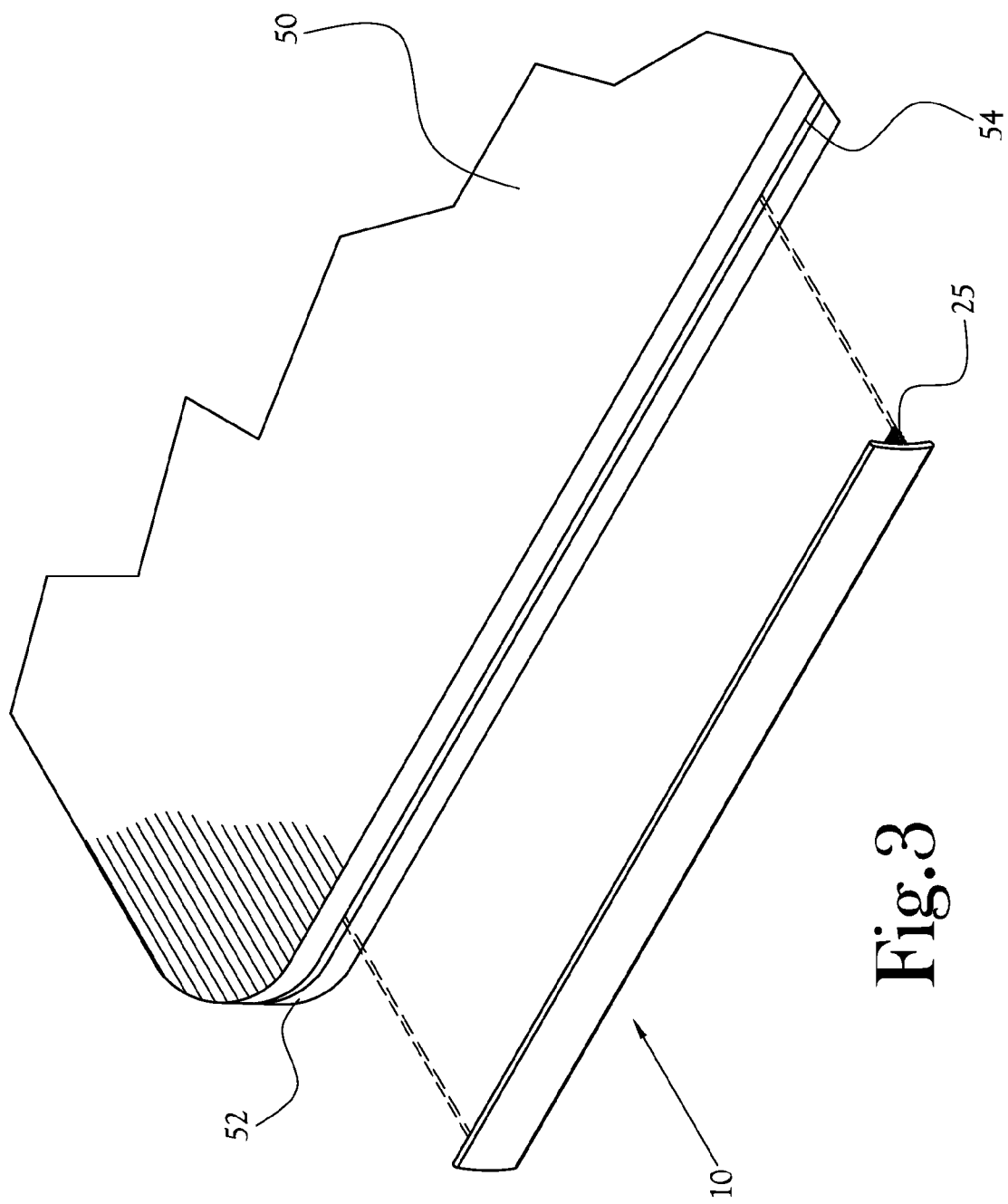
FIG. 3 is view of the T-molding shown in FIG. 1 being applied to the edge of a table top.

One example embodiment of a T-molding edge banding according to the present general inventive concept is illustrated generally at FIG. 1. As shown in FIG. 1 and in the close-up view the same example embodiment in FIG. 2, the T-molding 10 generally includes a long core strip (or core layer) 20 of thermoplastic olefin material (or other core material) comprising the core layer body. In FIG. 1, the T-molding 10 is shown so that the inboard face of the core strip 20 is facing upwards. A barbed mounting strip or simply "barb" 25 protrudes outward from the inboard face of the core strip 20 and extends lengthwise down the center of the inboard face of the core strip 20, approximately equidistant from either lengthwise edge 22 and 24 of the core strip 20. Generally, as shown in FIG. 3, the T-molding 10 is mounted to the edge 52 of a table top 50 by pressing the inboard face of the core strip 20 against the edge 52 of a table top 50 and inserting the barb 25 into a prepared or preformed mounting groove 54 in the edge 52. Often, the mounting groove 54 is slightly narrower in width than the thickness of the barb 25, so that the barb 25 fits snugly within the mounting groove 54 after application of the T-molding 10. The barbed sides of the barb 25 help to ensure that the barb 25 engages with the mounting groove 54 of the edge 52 in a close frictional fit that hinders any movement or separation of the T-molding 10 from the table top 50. The thermoplastic olefin material that generally comprises the barb 25 and core strip 20 gives the barb 25 superior "memory"—that is, once the barb 25 is inserted into the mounting groove 54, whereby the individual barbed protrusions on the sides of the barb 25 are compressed and flattened against the central axis of the barb 25, the individual barbed protrusions on the sides of the barb 25 show a great tendency to exert pressure against the walls of the mounting groove 54; in other words, compared to barbs made from polypropylene or PVC, a barb 25 fabricated from thermoplastic olefin material shows greater resiliency upon compression and a greater tendency to push back against deformative pressure within the mounting groove 54, thereby causing the individual barbed protrusions on the sides of the barb 25 to exert pressure on the walls of the mounting groove 54. In this way, the thermoplastic olefin material that generally comprises the barb 25 gives the barb 25 superior elastic memory and enhances the frictional fit between the barb 25 and the mounting groove 54.

Figure 4:
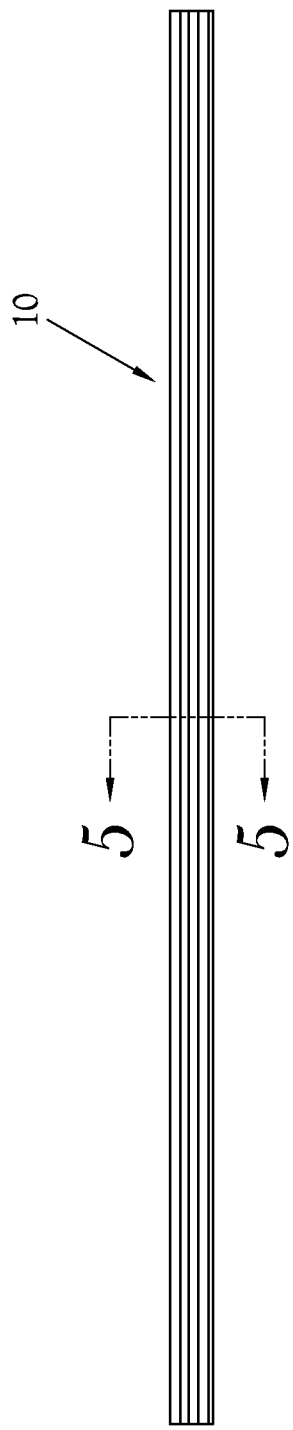
FIG. 4 is a top-down view of the embodiment shown in FIG. 1, looking directly at the inboard face of the core layer and showing the section line along which the section view in FIG. 5 is taken.
Figure 5:
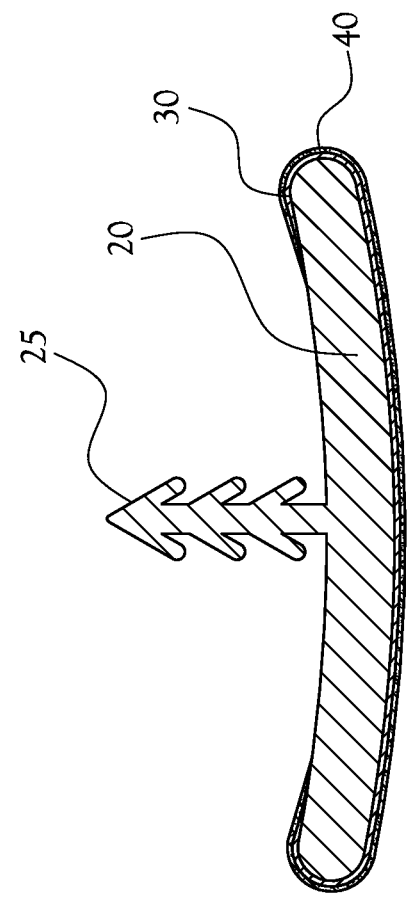
FIG. 5 is a section view of the embodiment shown in FIG. 1.

FIG. 4 presents a view of the inboard face of the core strip 20 of the illustrated example embodiment of T-molding 10, showing the position of a section view shown in FIG. 5. The section view of the T-molding 10 shown in FIG. 5 illustrates the layered composite construction of the T-molding 10. The core strip (or core layer) 20 and barb 25 generally are formed from a single shaped and extruded mass of core material, generally a thermoplastic olefin. As thermoplastic olefin materials generally do not exhibit great scruff, scratch, and abrasion resistance, it is desirable to protect the core layer 20 and barb 25 from scruffing, scratching, and abrasions by covering the outboard face of the core layer 20 with a protective layer (or top layer). In several embodiments, including the illustrated example embodiment, a top layer 30, generally much thinner than the core layer 20, is coextruded with the core layer 20 and covers the outboard face of the core layer 20. Often, the top layer 30 covers the outboard face of the core layer 20 and wraps around the lengthwise edges 22 and 24 of the core layer 20 and extends a few millimeters along the inboard face of the core layer 20 toward the barb 25. The top layer 30 has an inboard surface, facing and in physical contact with the outboard face of the core layer 20, and an opposing outboard surface, facing away from the core layer 20. Generally, the outboard surface of the top layer 30 is covered with a top coat 40 of curable material that reduces the marrability and enhances the abrasion resistance of the T-molding 10.

A number of different core materials, including a number of thermoplastic olefins, homopolymers, and polymer blends, are used in various example embodiments of the invention. Examples of core materials used to fabricated the core strip 20 and barb 25 of the T-molding include, but are not limited to, blends of polypropylene and polyethylene; blends of polypropylene, polyethylene, and rubber; blends of polypropylene, polyethylene, and block copolymer polypropylene; blends of polypropylene, polyethylene, block copolymer polypropylene, and a filler material; blends of polypropylene, polyethylene, block copolymer polypropylene, and rubber; blends of polypropylene, polyethylene, block copolymer polypropylene, rubber, and a filler material; blends of polypropylene, polyethylene, block copolymer polypropylene, and ethylene propylene rubber (EPR); blends of polypropylene, polyethylene, block copolymer polypropylene, and ethylene propyl-diene rubber; blends of polypropylene, polyethylene, block copolymer polypropylene, and ethylene-butadiene; blends of polypropylene, polyethylene, block copolymer polypropylene, and ethylene-octene; and blends of polypropylene, polyethylene, block copolymer polypropylene, and styrene-ethylene-butadiene-styrene. Other materials not mentioned in the foregoing list, and other combinations of materials, will be apparent to those of skill in the art as suitable materials for a core material, and these materials and combinations of materials are contemplated and encompassed by the present general inventive concept. It is also to be noted that the formulation of the core material used to fabricate the core strip 20 and barb 25 is adaptable to being adjusted in order to give the resulting T-molding a desired stiffness or modulus.

Generally the top layer 30 is fabricated from a resilient elastomeric polymer. In a number of example embodiments, the top layer 30 is fabricated from polypropylene. In other example embodiments, the top layer 30 is fabricated from polyethylene, ethylene-vinyl acetate, or a similar polymer. In other example embodiments, the top layer 30 is fabricated from a mixture of polypropylene and polyethylene, from a mixture of polypropylene and polyurethane, a mixture of polypropylene and ethylene-vinyl acetate, from a mixture of polypropylene, polyethylene, and polyurethane, from a mixture of polypropylene, polyethylene, and ethylene-vinyl acetate, or from other similar polymer mixtures and similar polymer materials. Other materials not mentioned in the foregoing list, and other combinations of materials, will be apparent to those of skill in the art as suitable materials for a top layer, and these materials and combinations of materials are contemplated and encompassed by the present general inventive concept.

The top coat 40 applied to the top layer 30 of the T-molding 10 generally is a curable material, and more particularly in several example embodiments is an activator material cured by exposure to ultraviolet light or electron bombardment during the manufacturing process. Examples of curable activator materials used for the top coat 40 include urethane, polyurethane, acrylic materials, a number of solvent-based mixtures, a number of water-based mixtures, and epoxy. Other materials not mentioned in the foregoing list, and other combinations of materials, will be apparent to those of skill in the art as suitable materials for a top coat, and these materials and combinations of materials are contemplated and encompassed by the present general inventive concept.

In several embodiments, the coextrusion of a thermoplastic-olefin-based core layer 20 and a polypropylene-based top layer 30, generally under heat, leads to a close chemical bond between the thermoplastic-olefin-based core layer 20 and the polypropylene-based top layer 30 at the points where the outboard face of the thermoplastic-olefin-based core layer 20 meets the inboard surface of the polypropylene-based top layer 30.

The present general inventive concept has been illustrated by description of certain example embodiments, and the illustrative example embodiments have been described in considerable detail, but it is not the intention of the applicant to restrict or in any way limit the scope of the appended claims to such detail. In some alternative embodiments of the present general inventive concept, two different thermoplastic olefin materials are used, one for the barb and the other for the core layer, generally with a softer thermoplastic olefin material used for the core layer and a harder thermoplastic olefin material used for the barb. In some alternative embodiments of the present general inventive concept, the core layer has a thickness that is greater at one edge than at the other edge.

The present general inventive concept generally embraces a number of multi-polymer T-moldings that combine a resilient, elastomeric olefin core layer with a top layer and a top coat that combine to provide superior physical properties. A T-molding according to the general inventive concept generally exhibits high temperature stability, great "barb memory," and high resistance to abrasion compared to competing T-molding edge bandings, including PVC-based T-moldings. Multi-polymer T-moldings according to the present invention generally are temperature stable compared to many competing T-molding edge bandings, and they have a stiffness that is minimally affected by changes in ambient temperature; thus, for example, it is feasible to use one formulation of thermoplastic olefin for the core layer year-round, whereas for PVC-based T-molding edge bandings, the temperature difference between summer and winter can dictate changes in the composition formulation used in the manufacturing process. Many multi-polymer T-moldings according to the present invention generally have better spring tension than other T-moldings will hold a shape in the face of deformative pressures better than competing T-moldings. Multi-polymer T-moldings according to the present invention show great resistance to abrasion and marring compared to PVC-based T-moldings. Fundamentally, multi-polymer T-moldings according to the present invention, compared to PVC-based T-molding, are better able to hold tight against the edge of a table top.

Additionally, a T-molding fabricated according to the present general inventive concept is typically more environmentally friendly than a PVC-based T-molding in so far as it generally avoids the use of halogen-containing materials like PVC in its manufacture.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A multi-polymer T-Molding to use on an edge of composite wood furniture, comprising:
   a core layer fabricated from an elastomeric plastic material, said core layer comprising a strip of material with an inboard face and an outboard face, said core layer having a barb to fit in a groove in the edge of composite wood furniture, said barb protruding from the inboard face of the strip of material from a position near the center of the strip of material, said strip of material and said barb comprising a single formed piece;
   a top layer substantially covering the outboard surface of said core layer, said top layer being formed from a material including polypropylene, said top layer having a different material composition than said core layer, said top layer having in inboard surface substantially in contact with the outboard surface of the strip of material, said top layer and said core layer being coextruded; and
   a top coat of curable material applied to the outboard surface of said top layer.

2. The multi-polymer T-Molding of claim 1 wherein said core layer includes a thermoplastic olefin.

3. The multi-polymer T-Molding of claim 1 wherein said top layer includes polyethylene.

4. The multi-polymer T-Molding of claim 1 wherein said top coat includes urethane, polyurethane, an acrylic material, or an epoxy material.

5. The multi-polymer T-Molding of claim 1 wherein said top coat includes an uncured material to be cured by exposure to ultraviolet light.

6. The multi-polymer T-Molding of claim 1 wherein said top coat includes an uncured material to be cured by exposure to electron bombardment.

7. An environmentally friendly multi-polymer T-Molding to use on an edge of furniture, comprising:
 a core layer fabricated from an elastomeric material that does not include polyvinyl chloride, said core layer comprising a strip of material with an inboard face and an outboard face, said core layer having a barb to fit in a groove in the edge of furniture, said barb protruding from the inboard face of the strip of material, said strip of material and said barb being formed from a single extruded material;
 a top layer substantially covering the outboard surface of said core layer, said top layer being formed from a plastic polymer material, said top layer having a different material composition than said core layer, said top layer having in inboard surface substantially in contact with the outboard surface of the strip of material; and
 a top coat of curable material applied to the outboard surface of said top layer.

8. The environmentally friendly multi-polymer T-Molding of claim 7 wherein said core layer includes a thermoplastic olefin.

9. The environmentally friendly multi-polymer T-Molding of claim 7 wherein said top layer includes polypropylene.

10. The environmentally friendly multi-polymer T-Molding of claim 7 wherein said top layer includes polyethylene.

11. The environmentally friendly multi-polymer T-Molding of claim 7 wherein said top layer includes a mixture of polypropylene and polyethylene.

12. The environmentally friendly multi-polymer T-Molding of claim 7 wherein said top coat includes urethane, polyurethane, an acrylic material, or an epoxy material.

13. The environmentally friendly multi-polymer T-Molding of claim 7 wherein said top coat includes an uncured material to be cured by exposure to ultraviolet light.

14. The environmentally friendly multi-polymer T-Molding of claim 7 wherein said top coat includes an uncured material to be cured by exposure to electron bombardment.

* * * * *